Patented Sept. 16, 1952

2,610,959

UNITED STATES PATENT OFFICE 2,610,959

THIXOTROPIC COMPOSITIONS

Birger W. Nordlander, Schenectady, N. Y., assignor to General Electric Company, a corporation of New York No Drawing. Application December 31, 1949, Serial No. 136,415

15 Claims. (Cl. 260—40)

This invention relates to thixotropic compositions, and more particularly to polymerizable thixotropic coating and filling compositions comprising a polymerizable liquid and a filler.

A problem of long standing encountered in factory practice in connection with the use of conventional varnishes for coating or filling applications is the excessive drainage from the coated or filled part after the varnish has been applied. A portion of this drainage occurs at room temperature immediately after the part has been removed from the treating tank because of the fluid nature of the conventional varnishes generally employed. This drainage continues until sufficient solvent has evaporated to cause the viscosity of the varnish on the surface or in the interstices of the treated object to become sufficiently high to enable it to remain in position. It is obvious that the nature of the process is such that too much of the varnish drains away from the top of the treated part and a surplus collects at the bottom of the part, resulting in a very uneven and undesirable ultimate distribution of the varnish base throughout the part. Further drainage occurs during the early stages of any baking process which might be involved, when the varnish base remaining in the treated part becomes increasingly fluid as the temperature is increased. This drainage will continue until the temperature is sufficiently high, and has been applied sufficiently long to cause the varnish to thicken or "skin over" due to polymerization reactions of one type or another, such as condensation, oxidation and addition reactions. Conventional varnishes also have a disadvantage in that they draw away from sharp corners and edges, leaving these regions practically bare.

The net result of methods of coating and filling in such a manner is very uneconomical utilization of the weight of varnish originally applied, only a fraction being retained. Furthermore, an undesirably uneven distribution of the varnish in the interstices and on the surface of the treated part results.

Where the problem of coating or filling electrical devices, such as, for example, electrical coils, has been involved, the amount of material retained after a single application is in most cases insufficient to afford a structure having the required electrical and mechanical properties. Several successive applications and bakings are usually necessary, adding considerably to the cost of the treatment. In the case of open structures, such as electrical coils, a complete filling becomes impossible employing the coating and filling compositions heretofore known in the art, not only because of the fact that the inert, volatile solvent in the composition must be expelled after each application, but also because many voids are sealed off during the evaporation of the solvents. In many cases these voids cannot be filled by additional varnish regardless of how many subsequent treatments are applied to the structure. This causes the treated structure to have an unequal thermal conductivity from one part to another as well as a much lower over-all heat dissipation rate as compared with a completely void-free structure. In high voltage equipment the presence of voids in the insulation also gives rise to internal corona discharge with resulting deterioration of the insulation.

Certain of the above difficulties can be eliminated by the use of so-called solventless varnishes. This term is intended in the present disclosure to cover compositions of matter which are polymerizable fluids substantially free of inert, volatile solvents such as those used in conventional varnishes, and which, by the incorporation of suitable catalysts, may be caused to polymerize to form substantially infusible and insoluble materials without the necessity of taking up oxygen from the air and without forming volatile products.

Since the conversion from the fluid to the hard, infusible stage occurs with little or no loss of the weight of material applied in the coating or filling operation, it is possible, by the use of proper vacuum-pressure impregnating technique, not only to fill completely all the spaces in an open structure, such as a coil, but also to maintain this condition subsequently during the curing operation, provided that substantially no drainage of varnish occurs during the baking process.

Many of the solventless varnishes of the type with which the present invention is concerned, and which will be hereinafter more fully described, comprise fairly fluid, non-volatile compositions. Therefore, in comparison with the conventional varnishes containing highly viscous or solid bases, these solventless varnish compositions suffer the disadvantage that they do not become increasingly viscous on standing at room temperature by the evaporation of a volatile inert solvent. As a result an open structure coated or filled with such a solventless varnish composition will continuously suffer loss of the varnish by drainage after it has been withdrawn from the treating tank and before it has been polymerized by heating. Furthermore, in common with the conventional varnishes containing appreciable amounts of solvents, many of the solventless varnishes have the disadvantage that during the early stages of the curing process their viscosity is substantially reduced, further aggravating the drainage problem. The difficulties arising out of this property of the solventless varnishes in many cases have proved to be serious enough to offset the principal advantage in using the solventless varnishes for the filling of open structures.

It is an object of the present invention to provide liquid coating and filling compositions which will not drain from objects prior to and during curing.

Another object of this invention is to provide coating and filling compositions which may be applied and cured without loss of the composition.

A further object of the present invention is to provide coating and filling compositions which when applied to objects will remain in situ before and during curing even in corners and sharp edges.

It has been discovered that the advantages in the use of solventless varnishes may be realized in coating and filling operations and at the same time the disadvantage of excessive drainage may be avoided by employing the compositions of this invention. These compositions may be converted by means of heat to an infusible and insoluble state and are suitable in general for coating and filling operations and particularly for the insulation of electrical equipment. After a coating of one of the present compositions has been applied to a part, little or no drainage of the composition from the part occurs, either at room temperature or at the elevated temperatures required for complete conversion of the composition to the infusible and insoluble state. The unusual combination of properties characterizing these compositions rests in the discovery that suitable quantities of certain specific fillers in combination with solventless varnishes or polymerizable liquids, form compositions which are fluid as long as they are kept in an agitated condition but solidify shortly after agitation has ceased and will not flow either at room temperature or at temperatures up to about 150° C. unless mechanically disturbed before they have hardened by polymerization.

While it is well known that the incorporation of fillers into a varnish will reduce the flow of the resulting mixture by reason of increased viscosity, this general property is not relied upon for the properties of the present compositions. The specific fillers which are here employed with solventless varnishes form thixotropic compositions capable of undergoing isothermal, reversible, sol-gel transformations, a fluid sol condition existing as long as the mixture is agitated, the sol reverting to a gel within a very short time after agitation has ceased. However, upon heating the gel it polymerizes into an infusible product which is no longer capable of reversion to the fluid sol state. The system may be simply expressed by the following relationship:

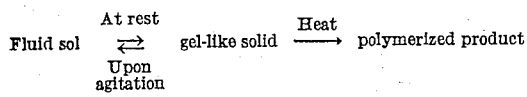

The term "thixotropy" is used herein to denote the property of a fluid filler-liquid composition to revert rapidly on standing into a gel-like mass having sufficient cohesive strength to withstand distortion by gravitational force when suspended freely as in an inverted receptacle or on a coated object. The gel is also of such a nature that it can be fluidified by the application of mechanical agitation as by shaking, stirring, vibrating, etc. The property of thixotropy as understood herein is thus characterized by a reversible isothermal sol ⇌ gel transition.

The compositions referred to above as solventless varnishes which are employed in combination with specific fillers to form the thixotropic composition of this invention are polymerizable fluids comprising an unsaturated alkyd resin. These liquid unsaturated alkyd resins are the reaction products of polyhydric alcohols, mixtures of polyhydric alcohols or mixtures of polyhydric and monohydric alcohols, and an alpha unsaturated alpha,beta polycarboxylic acid or a plurality of polycarboxylic acids, one of which, at least, is an alpha unsaturated alpha,beta polycarboxylic acid, the resinous material having an acid value of up to 60 and preferably between 45 and 60. Examples of such polyhydric alcohols are ethylene glycol, di- and triethylene glycols, propylene glycol, trimethylene glycol, tetramethylene glycol, pentamethylene gylcol, glycerine or pentaerythritol in in combination with a monohydric alcohol, etc. Examples of unsaturated polycarboxylic acids are maleic, fumaric, and itaconic acids. Anhydrides of polycarboxylic acids may also be employed. The term "polycarboxylic acid" as used herein is intended to include within its meaning the anhydrides of such acids. In addition to one or more of the unsaturated polycarboxylic acids, saturated polycarboxylic acids may also be present in the reaction mixture in the preparation of the resins referred to above. Examples of such saturated polycarboxylic acids are succinic, adipic, sebacic and phthalic acids.

In addition to the above unsaturated alkyd resins, the polymerizable fluids which are used in the present compositions may contain polymerizable substances such as, for example, esters of unsaturated monohydric alcohols and polycarboxylic acids, including unsaturated polycarboxylic acids, halogenated aromatic polycarboxylic acids and polybasic inorganic acids. Examples of such substances are diallyl phthalate, diallyl succinate, diallyl maleate, diallyl fumarate, diallyl itaconate, diallyl chlorophthalates, and triallyl phosphate. Other substances which may be incorporated in these polymerizable liquids are esters of monohydric alcohols and unsaturated polycarboxylic acids which are capable of copolymerizing with unsaturated alkyd resins such as, for example, dioctyl itaconate, dibenzyl itaconate, diethyl fumarate and dibenzyl fumarate.

The thixotropic compositions of this invention may be converted into an infusible, insoluble state by means of heat alone, for example, by curing parts coated or filled with these compositions at temperatures of from about 80° C. to about 150° C., or more preferably from about 100° C. to about 125° C. However, for practical reasons, it is desirable to incorporate a polymerization catalyst in order to accelerate the polymerization of the coating or filling compositions. Any of the catalysts known to those skilled in the art may be employed. Examples of such catalysts which have been found to be particularly suitable are benzoyl peroxide, tertiary butyl perbenzoate, ditertiary butyl diperphthalate, and tertiary butyl hydroperoxide. Any suitable amount of catalyst may be used, but in general the catalyst concentration will be within the range of from about 0.5 to about 2.0 percent by weight of the polymerizable liquid.

In copending applications Serial Nos. 136,411, 136,413, 136,412, 136,416, 136,417, and 136,418, filed concurrently herewith and assigned to the same assignee as the present invention, there have been described certain other thixotropic solventless varnish compositions. It has been found that powdered, dehydrated silica aerogel which consists essentially of silica aerogel has very useful properties in conjunction with the production of thixotropic solventless varnish materials.

All parts given in the examples are by weight.

*Example 1*

| | Parts |
|---|---|
| Diallyl phthalate | 44.5 |
| Diethylene glycol maleate | 44.5 |
| Tertiary butyl perbenzoate | 1.0 |
| Silica aerogel (powdered) | 10.0 |

The above materials yielded a smooth, highly thixotropic mixture after thorough stirring. A glass rod when dipped in the composition and suspended at room temperature, showed no drainage after sixteen hours. Neither was any drainage apparent after sixteen more hours at 100° C. during which period cure was effected. This is in direct contradistinction to results obtained with the above composition when no filler was used at all or when a non-effective filler was used such as flint or muscovite mica. In both the above cases only a very small fraction of the original coating remained after the rod was dipped in the material and allowed to hang for sixteen hours at room temperature and was cured for sixteen hours at 100° C.

*Example 2*

| | Parts |
|---|---|
| Diallyl phthalate | 44.0 |
| Diethylene glycol maleate | 44.0 |
| Tertiary butyl perbenzoate | 1.0 |
| Silica aerogel (powdered) | 11.0 |

The above ingredients formed a smooth blend having pronounced thixotropic characteristics when mixed by stirring. A glass rod dipped in the composition and withdrawn showed no drainage of material after sixteen hours at room temperature. Further treatment at 100° C. for sixteen hours also resulted in no drainage. When cured, these materials are characterized by extreme toughness.

The thixotropy-producing qualities of the silica aerogel are so pronounced that when the per cent by weight proportion of silica aerogel, based on the weight of the polymerizable ingredients, is above ten to eleven per cent the compositions produced are too viscous even in their liquefied condition to be of practical use as a dipping medium for parts which are to be coated.

While the above compositions are entirely suitable in and of themselves it is often desirable that thixotropic varnishes such as herein described should have as large an amount of filler as possible. Among the reasons for having such larger amounts of filler are the lowering of shrinkage during polymerization, lowering of costs, reduction of temperature coefficient of expansion and increasing the heat conductivity of the cured product and reducing the exothermic nature of the polymerization.

It has been found that the present silica gel with its pronounced thixotropy producing characteristics may be used to great advantage in combination with non-thixotropic producing fillers to produce over-all compositions which are thixotropic in nature.

*Example 3*

| | Parts |
|---|---|
| Diallyl phthalate | 19.5 |
| Diethylene glycol maleate | 19.5 |
| Tertiary butyl perbenzoate | 1.0 |
| Flint (powdered) | 60.0 |

The above mixture was thoroughly mixed to a smooth homogeneous mass which was not thixotropic in nature. When a glass rod was dipped in the mixture and withdrawn fifty-two per cent of the material had drained off after hanging for sixteen hours at room temperature.

*Example 4*

| | Parts |
|---|---|
| Diallyl phthalate | 19.5 |
| Diethylene glycol maleate | 19.5 |
| Tertiary butyl perbenzoate | 1.0 |
| Flint (powdered) | 59.0 |
| Silica aerogel (powdered) | 1.0 |

Upon thorough mixing, the above ingredients produced a smooth, homogeneous mass having pronounced thixotropic characteristics. When a glass rod was dipped in the above composition, withdrawn and hung at room temperature for sixteen hours, there was no visible drainage of material from the rod. Neither was any drainage apparent after curing for sixteen hours at 100° C. It is apparent from this example that as little as 2.56 percent, by weight, of the silica aerogel, based on the weight of the polymerizable ingredients, are effective in inducing thixotropy in non-thixotropic compositions.

*Example 5*

| | Parts |
|---|---|
| Diallyl phthalate | 22.0 |
| Diethylene glycol maleate | 22.0 |
| Tertiary butyl perbenzoate | 1.0 |
| Flint (powdered) | 55.0 |

When mixed, a composition such as that above exhibited no thixotropic properties. After sixteen hours at room temperature over seventy-eight percent of the material had drained off from a glass rod which had been dipped in the mixture and withdrawn.

*Example 6*

| | Parts |
|---|---|
| Diallyl phthalate | 21.0 |
| Diethylene glycol maleate | 21.0 |
| Tertiary butyl perbenzoate | 1.0 |
| Flint (powdered) | 55.0 |
| Silica aerogel (powdered) | 2.0 |

A composition containing the above ingredients, mixed by thorough stirring, exhibited pronounced thixotropy. There was no apparent drainage from a glass rod, dip-coated with the composition, after sixteen hours at room temperature or sixteen hours additional at 100° C.

*Example 7*

| | Parts |
|---|---|
| Diallyl phthalate | 24.5 |
| Diethylene glycol maleate | 24.5 |
| Tertiary butyl perbenzoate | 1.0 |
| Flint (powdered) | 50.0 |

When a glass rod was dip-coated with the composition prepared by thoroughly mixing the above ingredients about eighty-six percent of the coating material had drained off after the rod had hung in air at room temperature from sixteen hours. The composition exhibited no thixotropic properties.

Example 8

| | Parts |
|---|---|
| Diallyl phthalate | 23.25 |
| Diethylene glycol maleate | 23.25 |
| Tertiary butyl perbenzoate | 1.0 |
| Flint (powdered) | 50.0 |
| Silica aerogel (powdered) | 2.5 |

Pronounced thixotropic properties were apparent when the above ingredients were mixed by stirring into a smooth homogeneous mass. When a glass rod was dip-coated with the material, there was no apparent drainage of the material from the suspended rod after sixteen hours at room temperature or after an additional sixteen hours at 100° C.

Example 9

| | Parts |
|---|---|
| Diallyl phthalate | 30.3 |
| Diethylene glycol maleate | 30.3 |
| Tertiary butyl perbenzoate | 1.0 |
| Muscovite mica (powdered) | 39.4 |

When the above ingredients were thoroughly mixed together, no thixotropic properties were apparent. When a glass rod dip-coated with the composition was suspended at room temperature for sixteen hours the drainage loss of material was about thirty-three percent. After sixteen hours at 100° C., about nineteen percent more of the material had drained off.

Example 10

| | Parts |
|---|---|
| Diallyl phthalate | 30.3 |
| Diethylene glycol maleate | 30.3 |
| Tertiary butyl perbenzoate | 1.0 |
| Muscovite mica (powdered) | 36.9 |
| Silica aerogel (powdered) | 2.5 |

The smooth composition obtained by mixing together the above ingredients exhibited pronounced thixotropic properties. There was no drainage from a glass rod dipped in the composition after hanging sixteen hours at room temperature and sixteen hours at 100° C.

Example 11

| | Parts |
|---|---|
| Diallyl phthalate | 32.5 |
| Diethylene glycol maleate | 32.5 |
| Tertiary butyl perbenzoate | 1.0 |
| Muscovite mica (powdered) | 35.0 |

The above ingredients did not produce a thixotropic material when thoroughly mixed together. A glass rod dip-coated in it and suspended lost about forty-eight percent of the coating material by drainage after sixteen hours at room temperature. After sixteen more hours at 100° C., seven percent more had drained off for a total drainage loss of about fifty-five percent.

Example 12

| | Parts |
|---|---|
| Diallyl phthalate | 32.5 |
| Diethylene glycol maleate | 32.5 |
| Tertiary butyl perbenzoate | 1.0 |
| Muscovite mica (powdered) | 32.6 |
| Silica aerogel (powdered) | 2.4 |

The above ingredients produced a smooth, thixotropic composition upon stirring. A glass rod dip-coated with the material showed no drainage after sixteen hours at room temperature and none after an additional sixteen hours at 100° C.

From the above examples it will be apparent that not only will the silica aerogel of the present invention produce desirable thixotropic materials in conjunction with the solventless varnishes described herein, but that when incorporated in relatively small amounts it will cause such varnishes containing fillers which are non-effective in this respect to become thixotropic.

Solventless varnish compositions containing non-effective fillers, other than those given in the above examples, may also be rendered thixotropic by means of small added amounts of the present silica gel. Among such inert fillers are silex or sand, talc, Carborundum, Alundum, litharge, iron powder, zirconium oxide, calcium tungstate, tungsten oxide and nickel oxide. This offers a convenient method of controlling the thixotropic characteristics of the present compositions while retaining a high total filler content and utilizing to advantage whatever outstanding physical property (dielectric, moisture resistance, hardness, tensile strength, toughness, etc.) that the inert filler may contribute to the final heat-hardened product.

What I claim as new and desire to secure by Letters Patent of the United States, is:

1. A thixotropic composition comprising a polymerizable fluid comprising a liquid unsaturated alkyd resin obtained by the esterification of a mixture of ingredients comprising a polyhydric alcohol and an alpha unsaturated alpha,beta polycarboxylic acid and a filler comprising silica aerogel, the silica aerogel comprising from 2.56 to 11 percent, by weight, based on the weight of the polymerizable fluid.

2. A thixotropic composition comprising a polymerizable fluid comprising a liquid unsaturated alkyd resin obtained by the esterification of a mixture of ingredients comprising a polyhydric alcohol and an alpha unsaturated alpha,beta polycarboxylic acid and a polymerizable ester of an unsaturated monohydric alcohol and a polycarboxylic acid and a filler comprising silica aerogel, the silica aerogel comprising from 2.56 to 11 percent, by weight, based on the weight of the polymerizable fluid.

3. A thixotropic composition comprising a polymerizable fluid comprising a liquid unsaturated alkyd resin obtained by the esterification of a mixture of ingredients comprising a polyhydric alcohol and an alpha unsaturated alpha,beta polycarboxylic acid and an ester of monohydric alcohol and an unsaturated polycarboxylic acid capable of copolymerizing with unsaturated alkyd resins and a filler comprising silica aerogel, the silica aerogel comprising from 2.56 to 11 percent, by weight, based on the weight of the polymerizable fluid.

4. A thixotropic composition comprising a polymerizable fluid comprising liquid diethylene glycol maleate obtained by the esterification of a mixture of ingredients comprising diethylene glycol and maleic anhydride and diallyl phthalate and a filler material comprising silica aerogel, the silica aerogel comprising from 2.56 to 11 percent, by weight, based on the weight of the polymerizable fluid.

5. A thixotropic composition comprising a polymerizable fluid comprising liquid diethylene glycol maleate obtained by the esterification of a mixture of ingredients comprising diethylene glycol and maleic anhydride and a polymerizable ester of an unsaturated monohydric alcohol and a polycarboxylic acid and a filler comprising silica aerogel, the silica aerogel comprising from 2.56 to 11 percent, by weight, based on the weight of the polymerizable fluid.

6. A thixotropic composition comprising a polymerizable fluid comprising a liquid unsaturated alkyd resin obtained by the esterification of a mixture of ingredients comprising a polyhydric alcohol and an alpha unsaturated alpha,beta polycarboxylic acid and a filler comprising silica aerogel and flint, the silica aerogel comprising from 2.56 to 11 percent, by weight, based on the weight of the polymerizable fluid.

7. A thixotropic composition comprising a polymerizable fluid comprising a liquid unsaturated alkyd resin obtained by the esterification of a mixture of ingredients comprising a polyhydric alcohol and an alpha unsaturated alpha,beta polycarboxylic acid and a polymerizable ester of an unsaturated monohydric alcohol and a polycarboxylic acid and a filler comprising silica aerogel and flint, the silica aerogel comprising from 2.56 to 11 percent, by weight, based on the weight of the polymerizable fluid.

8. A thixotropic composition comprising a polymerizable fluid comprising a liquid unsaturated alkyd resin obtained by the esterification of a mixture of ingredients comprising a polyhydric alcohol and an alpha,beta polycarboxylic acid and an ester of a monohydric alcohol and an unsaturated polycarboxylic acid capable of copolymerizing with unsaturated alkyd resins and a filler comprising silica aerogel and flint, the silica aerogel comprising, by weight, from 2.56 to 11 percent, based on the weight of the polymerizable fluid.

9. A thixotropic composition comprising a polymerizable fluid comprising liquid diethylene glycol maleate obtained by the esterification of a mixture of ingredients comprising diethylene glycol and maleic anhydride and diallyl phthalate and a filler material comprising silica aerogel and flint, the silica aerogel comprising, by weight, from 2.56 to 11 percent, based on the weight of the polymerizable fluid.

10. A thixotropic composition comprising a polymerizable fluid comprising liquid diethylene glycol maleate obtained by the esterification of a mixture of ingredients comprising diethylene glycol and maleic anhydride and a polymerizable ester of an unsaturated monohydric alcohol and a polycarboxylic acid and a filler comprising silica aerogel and flint, the silica aerogel comprising, by weight, from 2.56 to 11 percent, based on the weight of the polymerizable fluid.

11. A thixotropic composition comprising a polymerizable fluid comprising a liquid unsaturated alkyd resin obtained by the esterification of a mixture of ingredients comprising a polyhydric alcohol and an alpha unsaturated alpha,beta polycarboxylic acid and a filler comprising silica aerogel and Muscovite mica, the silica aerogel comprising, by weight, from 2.56 to 11 percent, based on the weight of the polymerizable fluid.

12. A thixotropic composition comprising a polymerizable fluid comprising a liquid unsaturated alkyd resin obtained by the esterification of a mixture of ingredients comprising a polyhydric alcohol and an alpha unsaturated alpha,beta polycarboxylic acid and a polymerizable ester of an unsaturated monohydric alcohol and a polycarboxylic acid and a filler comprising silica aerogel and Muscovite mica, the silica aerogel comprising, by weight, from 2.56 to 11 percent, based on the weight of the polymerizable fluid.

13. A thixotropic composition comprising a polymerizable fluid comprising a liquid unsaturated alkyd resin obtained by the esterification of a mixture of ingredients comprising a polyhydric alcohol and an alpha unsaturated alpha,beta polycarboxylic acid and an ester of a monohydric alcohol and an unsaturated polycarboxylic acid capable of copolymerizing with unsaturated alkyd resins and a filler comprising silica aerogel and Muscovite mica, the silica aerogel comprising, by weight, from 2.56 to 11 percent, based on the weight of the polymerizable fluid.

14. A thixotropic composition comprising a polymerizable fluid comprising liquid diethylene glycol maleate obtained by the esterification of a mixture of ingredients comprising diethylene glycol and maleic anhydride and diallyl phthalate and a filler material comprising silica aerogel and Muscovite mica, the silica aerogel comprising, by weight, from 2.56 to 11 percent, based on the weight of the polymerizable fluid.

15. A thixotropic composition comprising a polymerizable fluid comprising liquid diethylene glycol maleate obtained by the esterification of a mixture of ingredients comprising diethylene glycol and maleic anhydride and a polymerizable ester of an unsaturated monohydric alcohol and a polycarboxylic acid and a filler comprising silica aerogel and Muscovite mica, the silica aerogel comprising, by weight, from 2.56 to 11 percent, based on the weight of the polymerizable fluid.

BIRGER W. NORDLANDER.

REFERENCES CITED

The following references are of record in the file of this patent:

UNITED STATES PATENTS

| Number | Name | Date |
| --- | --- | --- |
| 2,416,620 | Gans et al. | Feb. 25, 1947 |
| 2,443,736 | Kropa | June 22, 1948 |
| 2,482,086 | Foster | Sept. 20, 1949 |

OTHER REFERENCES

"Industrial Chemistry of Colloidal and Amorphous Materials" by Lewis et al., published in 1943 by MacMillan Co., page 327.